US008909462B2

(12) United States Patent
Lection et al.

(10) Patent No.: US 8,909,462 B2

(45) Date of Patent: Dec. 9, 2014

(54) CONTEXT-BASED TRAFFIC FLOW CONTROL

(75) Inventors: David B. Lection, Raleigh, NC (US); Eric L. Masselle, Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 347 days.

(21) Appl. No.: 13/178,071

(22) Filed: Jul. 7, 2011

(65) Prior Publication Data

US 2013/0013180 A1 Jan. 10, 2013

(51) Int. Cl.

| | |
|---|---|
| ***G06F 19/00*** | (2011.01) |
| ***G06G 7/70*** | (2006.01) |
| ***G06G 7/76*** | (2006.01) |
| ***G08G 1/00*** | (2006.01) |
| ***G08G 1/087*** | (2006.01) |
| ***G08G 1/081*** | (2006.01) |

(52) U.S. Cl.

CPC ................ *G08G 1/087* (2013.01); *G08G 1/081* (2013.01)

USPC ........... 701/117; 701/118; 701/119; 340/928; 340/909; 340/910

(58) Field of Classification Search

CPC . G08G 1/0104; G08G 1/096783; G08G 1/00; G08G 1/163; G08G 1/20; G06F 15/16; G06F 15/18; G06F 15/17; G06F 7/00; G06G 7/76; G06G 1/08; G06G 7/48; G06G 7/70; G06G 7/00

USPC ............ 701/117, 36, 718, 719; 340/910, 907, 340/905, 901, 935, 928; 348/149; 455/450; 705/1.1, 13; 356/28

See application file for complete search history.

(56) References Cited

U.S. PATENT DOCUMENTS

| | | | | |
|---|---|---|---|---|
| 3,818,429 | A * | 6/1974 | Meyer et al. | 340/910 |
| 5,821,878 | A * | 10/1998 | Raswant | 340/907 |
| 6,339,383 | B1 * | 1/2002 | Kobayashi et al. | 340/907 |
| 6,353,618 | B1 | 3/2002 | Hung et al. | |
| 6,496,773 | B1 * | 12/2002 | Olsson | 701/117 |
| 6,629,515 | B1 * | 10/2003 | Yamamoto et al. | 123/179.4 |
| 6,760,061 | B1 * | 7/2004 | Glier et al. | 348/149 |
| 6,937,161 | B2 * | 8/2005 | Nishimura | 340/917 |

(Continued)

FOREIGN PATENT DOCUMENTS

WO 2006090346 A1 8/2006

OTHER PUBLICATIONS

Ehlert et al.; "Microscopic Traffic Simulation with Reactive Driving Agents", IEEE Intelligent Transportation System, Proceedings, Aug. 25-29, 2001, pp. 860-865.

(Continued)

*Primary Examiner* — Calvin Cheung

*Assistant Examiner* — Luis A Martinez Borrero

(74) *Attorney, Agent, or Firm* — Cantor Colburn LLP

(57) ABSTRACT

Providing traffic flow control services includes receiving requests at an arbiter of a traffic control subsystem. The traffic control subsystem is in a first state, and the requests are received from vehicle transmitters in proximity of the traffic control subsystem. Traffic flow control services also include applying a pre-defined condition to the requests and implementing a traffic flow control activity responsive to application of the pre-defined condition. The traffic flow control activity includes maintaining the first state or changing the first state of the traffic control subsystem to a second state.

15 Claims, 3 Drawing Sheets

(56) References Cited

U.S. PATENT DOCUMENTS

| | | | | |
|---|---|---|---|---|
| 6,985,073 | B1 * | 1/2006 | Doan | 340/425.5 |
| 7,002,486 | B2 * | 2/2006 | Lawrence | 340/905 |
| 7,136,828 | B1 * | 11/2006 | Allen et al. | 705/13 |
| 7,495,579 | B2 * | 2/2009 | Sirota et al. | 340/907 |
| 7,518,531 | B2 * | 4/2009 | Butzer et al. | 340/907 |
| 7,616,293 | B2 * | 11/2009 | Sirota et al. | 356/28 |
| 7,636,356 | B1 | 12/2009 | Melman et al. | |
| 7,755,510 | B2 | 7/2010 | Bilimoria et al. | |
| 7,860,639 | B2 * | 12/2010 | Yang | 701/117 |
| 7,969,324 | B2 * | 6/2011 | Chevion et al. | 340/901 |
| 7,991,542 | B2 * | 8/2011 | Giles et al. | 701/119 |
| 8,149,139 | B2 * | 4/2012 | Coffee et al. | 340/928 |
| 8,200,529 | B2 * | 6/2012 | Hamilton et al. | 705/13 |
| 2002/0065599 | A1 * | 5/2002 | Hameleers et al. | 701/117 |
| 2003/0020633 | A1 * | 1/2003 | Lee | 340/907 |
| 2003/0060968 | A1 * | 3/2003 | MacPhail et al. | 701/117 |
| 2003/0063016 | A1 * | 4/2003 | Mathias | 340/907 |
| 2004/0119609 | A1 * | 6/2004 | Solomon | 340/928 |
| 2005/0187701 | A1 | 8/2005 | Baney | |
| 2006/0178794 | A1 * | 8/2006 | Chen et al. | 701/36 |
| 2007/0038361 | A1 * | 2/2007 | Yavitz et al. | 701/117 |
| 2007/0087756 | A1 * | 4/2007 | Hoffberg | 455/450 |
| 2007/0135989 | A1 * | 6/2007 | Hengst | 701/117 |
| 2007/0222639 | A1 * | 9/2007 | Giles et al. | 340/907 |
| 2007/0273552 | A1 * | 11/2007 | Tischer | 340/910 |
| 2008/0086241 | A1 | 4/2008 | Phillips et al. | |
| 2008/0086258 | A1 * | 4/2008 | Wall | 701/117 |
| 2008/0172171 | A1 | 7/2008 | Kowalski | |
| 2009/0051568 | A1 * | 2/2009 | Corry et al. | 340/935 |
| 2009/0295599 | A1 * | 12/2009 | Coffee et al. | 340/928 |
| 2010/0079306 | A1 | 4/2010 | Liu et al. | |
| 2010/0134320 | A1 * | 6/2010 | Chevion et al. | 340/932 |
| 2010/0153125 | A1 * | 6/2010 | Hamilton et al. | 705/1.1 |
| 2010/0228467 | A1 | 9/2010 | Wolfe | |
| 2010/0309023 | A1 | 12/2010 | Busch | |
| 2011/0004513 | A1 | 1/2011 | Hoffberg | |
| 2011/0018701 | A1 | 1/2011 | Mizuno | |
| 2011/0019548 | A1 | 1/2011 | Ohno | |
| 2011/0046867 | A1 * | 2/2011 | Oexmann | 701/117 |
| 2011/0087430 | A1 * | 4/2011 | Boss et al. | 701/202 |
| 2011/0145089 | A1 * | 6/2011 | Khunger et al. | 705/26.4 |
| 2011/0205086 | A1 * | 8/2011 | Lamprecht et al. | 340/928 |
| 2011/0246210 | A1 * | 10/2011 | Matsur | 705/1.1 |
| 2012/0130776 | A1 * | 5/2012 | Kang | 705/13 |
| 2012/0324091 | A9 * | 12/2012 | Raleigh et al. | 709/224 |
| 2013/0013179 | A1 * | 1/2013 | Lection et al. | 701/117 |

OTHER PUBLICATIONS

Park et al.; "Design of Real-Time Control System for Controlling Unmanned Vehicle", ICCAS International Conference on, Oct. 17-20, 2007, pp. 1234-1237.

Touchton et al.; "Perception and Planning Architecture for Autonomous Ground Vehicles", IEEE Computer Society, vol. 39, Iss. 12, Dec. 2006, pp. 40-47.

Zheng et al.; "Complexity of Component-Based Development of Embedded Systems", World Academy of Science, Engineering and Technology, Aug. 2005, pp. 282-287.

* cited by examiner

CONTEXT-BASED TRAFFIC FLOW CONTROL

BACKGROUND

The present invention relates to traffic control systems, and more specifically, to context-based traffic flow controls.

Designing systems of roads and associated traffic controls to permit optimal flow of vehicles can be a challenge. Frequently, a traffic control system that is historically known to be optimal during a particular time of day may be far from optimal at that time of day due to events, such as weather conditions, construction detours, traffic accidents, etc. Further, creating and maintaining optimal traffic control systems is expensive. In addition to a network of traffic lights and signage, many highly trafficked areas are also assigned traffic control police to safely direct vehicles through busy intersections and high-volume traffic merging areas. Cash-strapped municipalities would benefit from a system that is able to provide optimal traffic flow while generating income at the same time.

SUMMARY

According to one embodiment of the present invention, a system for providing traffic flow control services are provided. The system includes a computer processor and logic executable by the computer processor. The logic is configured to implement a method. The method includes receiving requests at an arbiter of a traffic control subsystem. The traffic control subsystem is in a first state, and the requests are received from vehicle transmitters in proximity of the traffic control subsystem. The method also includes applying a pre-defined condition to the requests and implementing a traffic flow control activity responsive to application of the pre-defined condition. The traffic flow control activity includes maintaining the first state or changing the first state of the traffic control subsystem to a second state.

According to another embodiment of the present invention, a method for providing traffic flow control services are provided. The method includes receiving requests at an arbiter of a traffic control subsystem. The traffic control subsystem is in a first state, and the requests are received from vehicle transmitters in proximity of the traffic control subsystem. The method also includes applying a pre-defined condition to the requests and implementing a traffic flow control activity responsive to application of the pre-defined condition. The traffic flow control activity includes maintaining the first state or changing the first state of the traffic control subsystem to a second state.

According to a further embodiment of the present invention, a computer program product for providing traffic flow control services are provided. The computer program product includes a storage medium embodied with instructions which when executed by a computer cause the computer to implement a method. The method includes receiving requests at an arbiter of a traffic control subsystem. The traffic control subsystem is in a first state, and the requests are received from vehicle transmitters in proximity of the traffic control subsystem. The method also includes applying a pre-defined condition to the requests and implementing a traffic flow control activity responsive to application of the pre-defined condition. The traffic flow control activity includes maintaining the first state or changing the first state of the traffic control subsystem to a second state.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

According to an exemplary embodiment, traffic flow control services are provided. The traffic flow control services enable traffic flow control system operations to be determined and implemented based on contextual information derived from sources including vehicles in proximity of the traffic flow control system, as well as considerations configured by an entity or administrator of the exemplary traffic flow control services. In an exemplary embodiment, the traffic flow control services maintain or change the state of a traffic flow control device as a function of known and/or recently acquired contextual information. In one exemplary embodiment, the traffic flow control processes manage operation of the traffic flow control device based on requests received from the vehicles. The requests may be in the form of bids representing a number of units, where each of the units is associated with a monetary value. Vehicle operators may configure preferences via a user interface of the traffic flow control services or may send requests when approaching the traffic flow control device.

Figure 1:
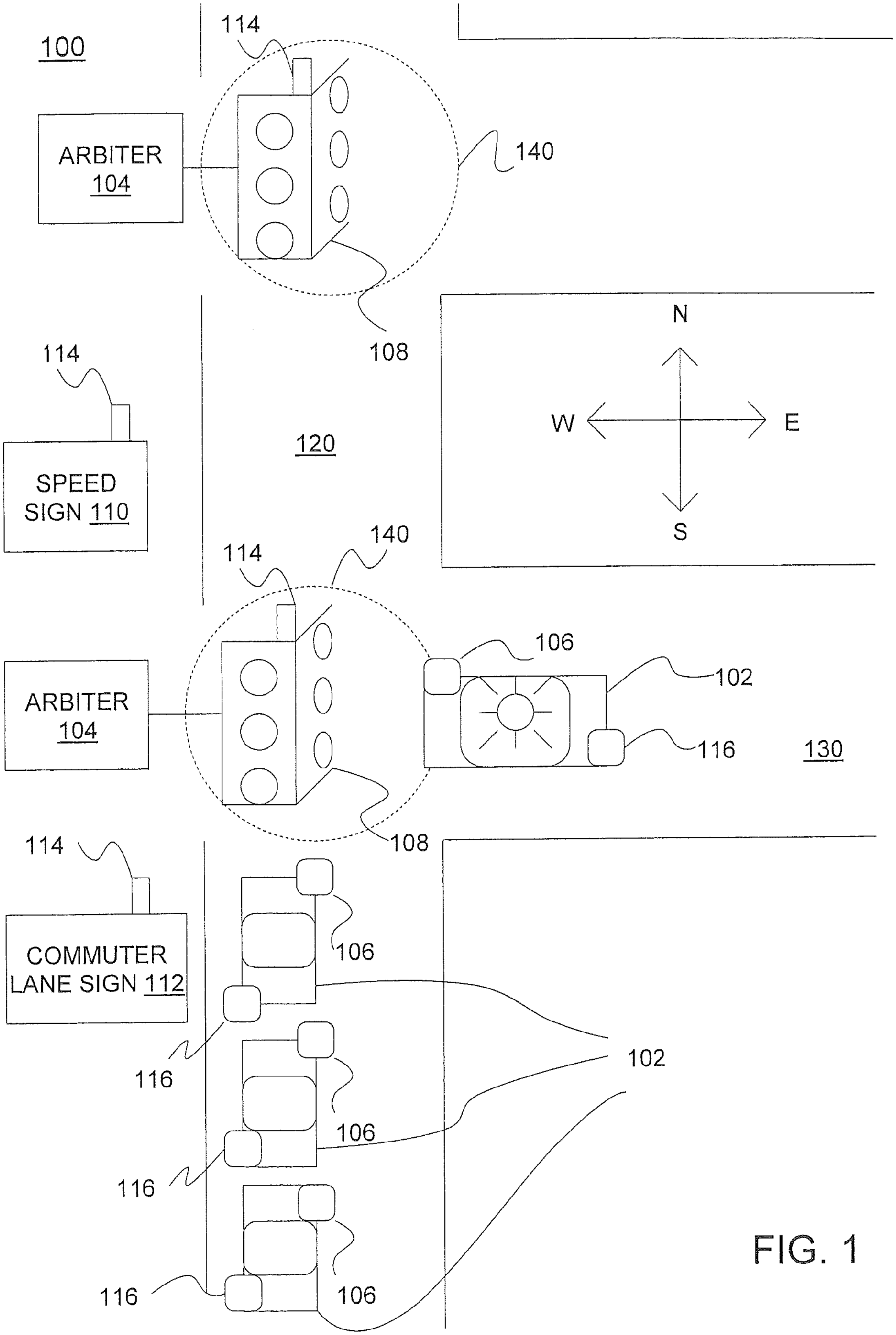
FIG. 1 depicts a block diagram of a system upon which traffic flow control services may be implemented according to an embodiment of the present invention.

Turning now to FIG. 1, a system upon which the traffic flow control services may be implemented will now be described in an exemplary embodiment. The system 100 of FIG. 1 includes vehicles 102 in communication with one or more arbiters 104 via vehicle transmitters 106 disposed on or otherwise communicatively coupled with the vehicles 102.

As shown in FIG. 1, one of the vehicles 102 is facing in a westerly direction on a road 130 at the intersection of another road 120. For purposes of illustration, the vehicle 102 on the road 130 is an emergency vehicle, such as a police vehicle. The emergency vehicle 102 is en route to a location via an emergency call received through dispatch. Also, as shown in FIG. 1 by way of non-limiting example, three vehicles 102 are facing in a northerly direction on the road 120 at the intersection of road 130.

In an exemplary embodiment, the arbiters 104 are communicatively coupled to one or more corresponding traffic control subsystems (also referred to herein as “traffic control devices”) 108, 110, and 112 either in a wired or wireless fashion. The arbiters 104 may be implemented as a combination of hardware and software. For example, the arbiters 104 may include one or more computer processing units (CPUs)

executing logic configured to perform the exemplary traffic flow control services described herein. In an exemplary embodiment the arbiters 104 include communication components, e.g., receivers, for receiving requests from vehicle transmitters 106. The arbiters 104 are configured with communication components for sending instructions to the traffic control subsystems 108, 110, and/or 112.

In an embodiment, one or more arbiters 104 may be communicatively coupled to each other, e.g., over a wireless communications network, such that the actions prescribed by one of the arbiters 104 for a corresponding traffic control subsystem may be conveyed or communicated to another arbiter 104, and the other arbiter 104 may prescribe similar actions to its corresponding traffic control subsystems, depending on the network configuration of the traffic flow control services. Knowledge of an action determined by one or more arbiters 104 may then become a component of the pre-defined conditions applied to requests received at another arbiter 104.

The traffic control subsystems 108 refer to a set of traffic lights disposed at an intersection; a non-limiting example thereof is illustrated in FIG. 1. The intersections shown in FIG. 1 are three-way intersections for purposes of illustration. Accordingly, the traffic control subsystems 108 each reflect a three-way set of traffic lights. The traffic lights may be sets of three lights (e.g., red, yellow, and green) or may be blinking red and yellow lights.

The traffic control subsystem 110 relates to an electronic speed sign. The electronic speed sign 110 displays a speed limit proscribed for a geographic area and may include a receiver for receiving signals from the arbiter 104. Alternatively, the arbiter 104 may be communicatively coupled to the electronic speed sign 110 in a wired fashion. The traffic control subsystem 112 relates to a commuter lane sign. Similar to the electronic speed sign 110, the commuter lane sign may include a receiver for receiving signals from the arbiter 104 or the arbiter 104 may be communicatively coupled to the commuter lane sign 112 in a wired fashion. The function of commuter lane sign 112 is to permit vehicles having two or more passengers to commute in an otherwise restricted lane.

In one embodiment, a video recording device 114 is disposed on (or integrated with) each of the sets of traffic lights 108 for monitoring the volume and flow of traffic. It will be understood that the video recording device 114 may alternatively, or additionally, be disposed on other traffic control subsystems, such as the electronic speed sign 110 and the commuter lane sign 112. The video recording device 114 may be communicatively coupled to the arbiter 104 and may share recorded information with the arbiter 104.

In an exemplary embodiment, the vehicles 102 include transmitters 106 for transmitting requests to the arbiters 104, as will be described further herein. In addition, the vehicles 102 may also include vehicle preference agents 116. In an exemplary embodiment, the vehicle preference agents 116 are implemented as logic configured for execution by a computer processor (e.g., a control system of the vehicle). The vehicle preference agent 116 may be stored at the vehicle 102 or may be in communication with the vehicle transmitter 106, e.g., via a communication device. For example, if the vehicle operator has a hand held communication device equipped with the vehicle preference agent 116, the hand held communication device may transmit preferences to the transmitter 106 (e.g., using wireless protocols, such as BlueTooth™). In another embodiment, a vehicle operator may transmit requests directly through the transmitter 106, via a control option on the vehicle 102.

As indicated above, the exemplary traffic flow control services enable traffic flow control system operations to be determined and implemented based on contextual information derived from sources including vehicles in proximity of the traffic flow control system, as well as considerations configured by an entity or administrator of the exemplary traffic flow control services.

Figure 3:
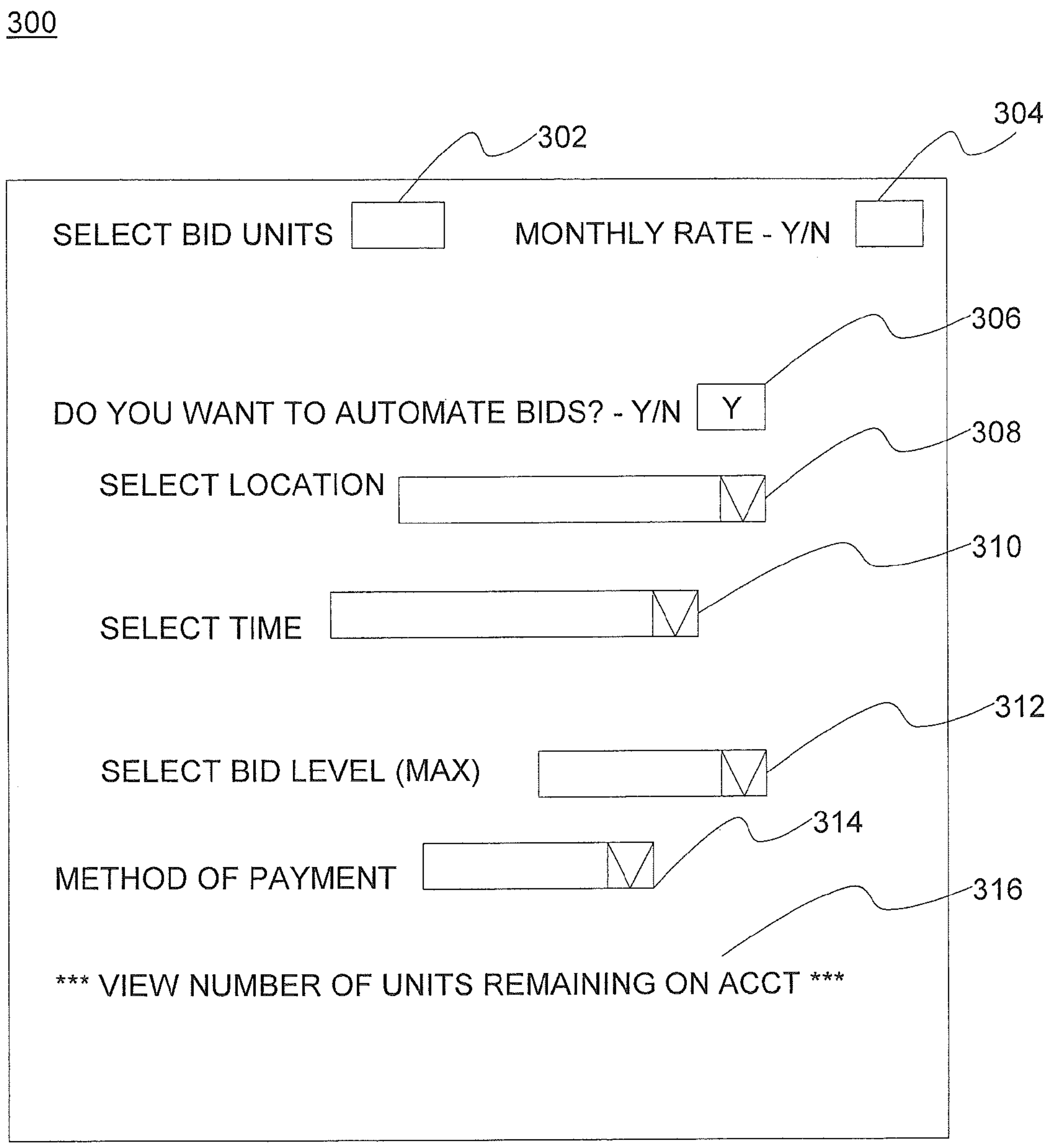
FIG. 3 depicts a user interface screen for configuring traffic flow control processes according to an embodiment of the present invention.

In one exemplary embodiment, vehicle operators in proximity of a traffic control subsystem 108, 110, and/or 112 initiate requests to either change the state of the subsystem or to maintain the state of the subsystem. The requests may be generated via a control option on the vehicle 102 that communicates the request wirelessly through the transmitter 106 to the arbiter 104. Alternatively, the request may be pre-configured by the vehicle operator through a user interface provided by the traffic flow control services logic, e.g., as a web interface. In one embodiment, the operator may configure preferences directed to particular travel routes or locations (e.g., defined by intersections, streets, cities, defined routes, etc.) A sample user interface 300 for configuring the preferences is shown in FIG. 3.

An administrator (e.g., municipal representative of a community in which the traffic flow control services is employed) may configure the arbiters 104 via, e.g., a user interface provided via the logic developed for the traffic flow control services. In one embodiment, the administrator may factor in contextual information relating to a location of a particular traffic control subsystem in determining what, if any, constraints may be applied to the traffic flow control processes. For example, requests from vehicles 102 to change the state of a traffic light at an intersection from red to green may be overridden when it is determined that an emergency vehicle is attempting to cross the intersection. This determination may be made by information received by the arbiter 104 via the video recording device 114 (visible observation of the emergency vehicle) or by a distinct signal received from the transmitter 106 of the emergency vehicle (e.g., a signal transmitted at a different frequency than standard vehicles). In another example, requests from vehicles 102 to change the state of a traffic light from red to green may be overridden when it is determined that an unsafe condition exists, such as road construction further along the travel route of the vehicles 102. In this manner, the management of the number or frequency of red lights along a road via the traffic flow control processes may ensure that the overall speed of the vehicles is controlled. In a further example, time of year or seasonal events may be used to manage traffic flows (e.g., traffic control subsystems may be configured via applied constraints through the arbiter 104 to ensure safety around school zones during the school year, while removing these constraints during summer months).

Figure 2:
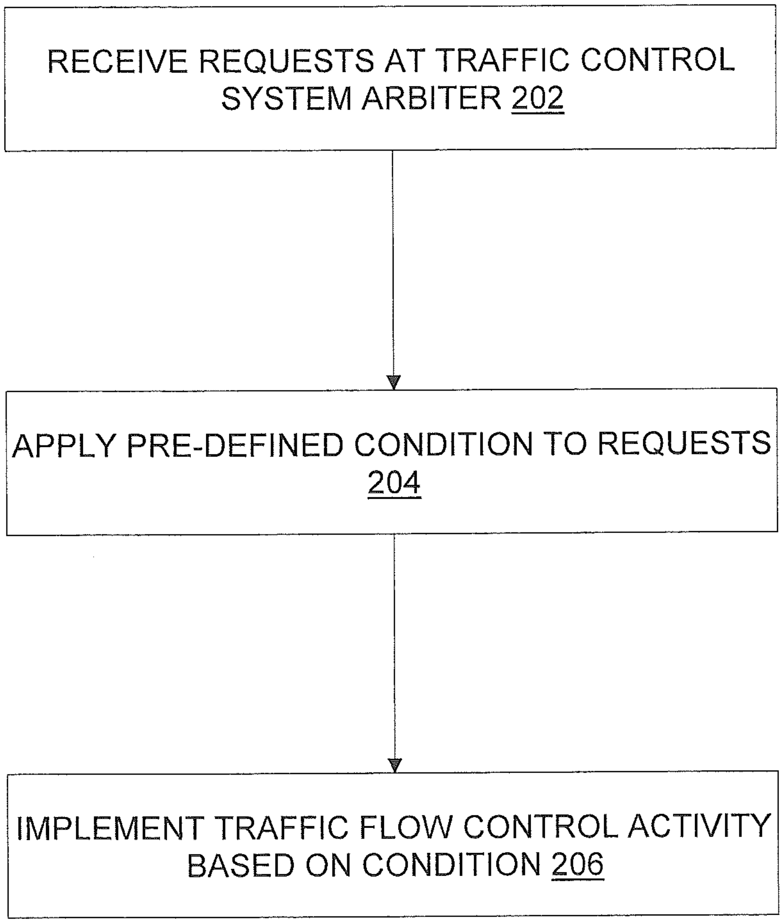
FIG. 2 depicts a flow diagram describing a process for implementing traffic flow control services according to an embodiment of the present invention.

Turning now to FIG. 2, a flow diagram describing a process for implementing the traffic flow control services will now be described in an exemplary embodiment. The process of FIG. 2 assumes that vehicle operators have registered or subscribed to the traffic flow control services. The services may be offered as a means to improve traffic flow, as the system responds to actual traffic flow weighted by the collective desire of travelers. In addition, the services provide a means to improve safety in a community, as well as to generate income for the community. The traffic flow control services may be implemented as a fee-based service whereby vehicle operators pay for bids to collectively control the operation of traffic control subsystems.

At step 202, an arbiter 104 receives requests from vehicle transmitters 106 associated with vehicles in proximity of a corresponding traffic control subsystem (e.g., control subsystems 108, 110, 112). The traffic control subsystem is in a first state. For example, if the traffic control subsystem is the set of traffic lights 108, the first state may be a red light on one side of the set, and a green light on another side of the set. If the traffic control subsystem is an electronic speed sign 110, the first state reflects the currently proscribed speed limit assigned for the area. If the traffic control subsystem is the commuter lane sign 112, the first state reflects the current status (e.g., open/closed to all traffic) with respect to a commuter lane.

A portion of the requests may be an appeal to maintain the first state of the traffic control subsystem (e.g., for vehicles 102 that currently have a green light as they are approaching a set of traffic lights 108 from a first direction), and a portion of the requests may be an appeal to change the first state of the traffic control subsystem to a second state (e.g., for vehicles 102 that currently have a red light as they are approaching the set of traffic lights 108 from a second direction, whereby the second state is a green light). If the traffic control subsystem is an electronic speed sign 110, the requests may be an appeal from the vehicles 102 to increase the speed limit on the sign 110 or maintain the speed limit (if already set at a maximum proscribed speed). Likewise, if the traffic control subsystem is a commuter lane sign 112, the requests may be an appeal to open the commuter lane to all traffic, or to maintain an already open status.

At step 204, in an exemplary embodiment, the arbiter 104 processes the requests. The arbiter 104 applies one or more pre-defined conditions to the requests. In one embodiment, the conditions include comparing a number of requests to change the state of the traffic control subsystem to a number of requests to maintain the state of the traffic control subsystem. The requests may each be weighted according to a number of units associated with the requests (bids) where each unit may be associated with a monetary value. In this embodiment, the more units associated with a request, the greater the weight of the request in the determination.

At step 206, implementing a traffic flow control activity responsive to the application of the pre-defined condition. As indicated above, the traffic flow control activity may include maintaining the first state or and changing the first state of the traffic control subsystem to a second state. In one embodiment, the arbiter 104 maintains the first state (e.g., 'red' light) of the traffic control subsystem if the total number of units from the bids (or monetary value thereof) received from a first set of vehicles 102 (e.g., the vehicles 102 facing northerly on the road 120 of FIG. 1) is greater than the total number of units (or the monetary value thereof) from the bids received from another set of vehicles 102 (e.g., the vehicle 102 facing westerly on the road 130 of FIG. 1). Likewise, the arbiter 104 changes the state of the traffic control subsystem to the second state (e.g., 'green') if the total number of units from the bids from the other set of vehicles 102 is less than the total number of units from the bids received from the first set of vehicles.

As indicated above, the requests may be processed in view of constraints configured by an administrator of the traffic flow control services. A number of various constraints may be employed in this process. For example, as indicated above, road conditions or safety concerns may operate as constraints, as well as emergency vehicles in the vicinity that are en route to a location. In addition, other constraints may be factored into the process, such as a minimum and/or maximum time period a traffic control subsystem must be engaged in a first or second state. For example, a set of traffic lights 108 may be configured to remain in a red state for a minimum of 15 seconds. If the requests to change the state of the traffic lights 108 are greater than the requests to maintain the state of the green light 108 for opposing traffic, the requests to change the state may be overridden by the system if the minimum period of time has not been met.

If a request from a vehicle operator is not successful, i.e., request is not honored, the corresponding bid(s) from the operator may not be charged against the operator's account. In this manner, the arbiter 104 sends tallies of successful bids to a collection system (not shown) and the successful bids are used to determine the fees assessed to an account.

In another embodiment, the conditions include evaluating the number of requests, or the overall monetary value of bids, from one or more vehicles 102 at opposing sides of an intersection against the volume of vehicles 102 in proximity of the intersection. For example, where vehicles 102 in one direction "win" the bid but the volume of traffic in the opposing direction exceeds some defined threshold value (e.g., a configured constraint), the winning bids may be overridden in favor of a compelling interest in keeping the flow of traffic moving to ensure safety on the road.

As indicated above, the traffic control subsystems 108, 110, and 112 may collectively form a traffic control subsystem for a given road or region. In one embodiment, an arbiter 104 receives information from another arbiter 104, and the arbiters 104 may work cooperatively to form a decision for a traffic flow control activity (e.g., based on requests received for multiple corresponding traffic control subsystems. The traffic control subsystems perform a corresponding traffic flow control activity either in tandem or in sequence based on the need.

Turning now to FIG. 3, a user interface screen 300 for configuring preferences of the traffic flow control services will now be described. A user may purchase a number of bid units via an option 302 on the user interface screen 300. Alternatively, the user may be offered an option 304 to purchase a maximum number of units at a monthly rate. The user interface screen 300 enables the user to automate the bidding process via an option 306. This option 306 authorizes the vehicle preference agent 116 to automatically transmit requests via the transmitter 106 when in proximity of a traffic control subsystem. The automation may be further enhanced with features for selecting a location (e.g., road, intersection, city, etc.) when bids will be automatically generated (e.g., via option 308), a time of day when bids will be automatically generated (e.g., via option 310), and a bid level to apply to each of the configured bids (e.g., via option 312). For example, the user may configure three units for one or more intersections selected from the option 308. The user is prompted to enter payment information via option 314. In one embodiment, the user may check the number of units remaining on the account via an option 316.

Technical effects of the invention include the ability to enable traffic flow control system operations to be determined and implemented based on contextual information derived from sources including vehicles in proximity of the traffic flow control system, as well as considerations configured by an entity or administrator of the exemplary traffic flow control services. The traffic flow control services maintain or change the state of a traffic flow control device as a function of known and/or recently acquired contextual information. The traffic flow control processes manage operation of the traffic flow control device based, in part, on requests received from the vehicles.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method for providing traffic flow control services, the method comprising:

receiving requests, at an arbiter of a traffic control subsystem, the arbiter including a computer processor, the traffic control subsystem is in a first state, the requests received from vehicle transmitters of vehicles that are commuting in proximity of the traffic control subsystem;

applying, via the computer processor, a pre-defined condition to the requests; and implementing, via the computer processor, a traffic flow control activity responsive to application of the pre-defined condition, the traffic flow control activity including one of: maintaining the first state, and changing the first state of the traffic control subsystem to a second state;

wherein each of the requests is implemented as a bid representing a number of units, each of the units associated with a monetary value, and the arbiter is configured to receive a bid level corresponding to the number of units generated for each of the requests;

wherein the traffic control subsystem is a set of traffic lights at an intersection, the method further comprising:

appealing, via a portion of the requests from a first set of vehicles facing a first direction at the intersection, to change a traffic light in the set of traffic lights from the first state to the second state; and appealing, via another portion of the requests from a second set of vehicles facing a second direction at the intersection, to maintain in the first state a traffic light in the set of traffic lights.

2. The method of claim 1, wherein the traffic control subsystem includes:

an electronic speed sign, the requests specify an appeal to increase the speed limit, and the pre-defined condition is met when a volume of vehicles in a defined area associated with the electronic speed sign meets a threshold level, wherein a current speed limit is the first state and an increased speed limit is the second state; and an electronic commuter lane sign, the requests specify an appeal to open a commuter lane to all traffic, and the pre-defined condition is met when a volume of vehicles in a defined area associated with the electronic commuter lane sign meets a threshold level, wherein a restriction on a use of commuter lane is the first state and a removal of the restriction on the use of the commuter lane is the second state.

3. The method of claim 1, wherein the pre-defined condition includes:

maintaining the first state if an overall monetary value of the bids from the second set of vehicles meets or exceeds an overall monetary value of the bids from the first set of vehicles; and changing the first state to the second state if an overall monetary value of the bids from the second set of vehicles is less than an overall monetary value of the bids from the first set of vehicles.

4. The method of claim 1, wherein the pre-defined condition includes:

maintaining the first state if a total number of units from the bids received from the second set of vehicles meets or exceeds a total number of units from the bids received from the first set of vehicles; and changing the first state to the second state if a total number of units from the bids from the second set of vehicles is less than the total number of units from the bids received from the first set of vehicles.

5. The method of claim 1, further comprising:

applying a constraint to the requests, the constraint comprising one of:

a minimum time period in at least one of the first state and the second state;

a maximum time period in at least one of the first state and the second state;

identification of an emergency vehicle in proximity of the traffic control subsystem;

weather conditions detected in proximity of the traffic control subsystem; and road conditions detected in proximity of the traffic control subsystem; and implementing the traffic flow control activity responsive to application of the pre-defined condition and the constraint.

6. The method of claim 1, further comprising:

receiving, at the arbiter of the traffic control subsystem, a request from a second arbiter of another traffic control subsystem, the arbiter of the traffic control subsystem and the second arbiter of the other traffic control subsystem forming part of a traffic control system, the traffic control system collectively rendering a decision for a traffic flow control activity based on requests received at multiple traffic control subsystems, and implementing, by each of the multiple traffic control subsystems including the traffic control subsystem and the other traffic control subsystem, the traffic flow control activity associated with the decision.

7. A system for providing traffic flow control services, comprising:

a computer hardware device comprising a computer processor, the computer processor configured to:

receive requests, at an arbiter of a traffic control subsystem, the arbiter including the computer processor, the traffic control subsystem is in a first state, the requests received from vehicle transmitters of vehicles that are commuting in proximity of the traffic control subsystem;

apply a pre-defined condition to the requests; and implement a traffic flow control activity responsive to application of the pre-defined condition, the traffic flow control activity including one of: maintaining the first state, and changing the first state of the traffic control subsystem to a second state;

wherein each of the requests is implemented as a bid representing a number of units, each of the units associated with a monetary value, and the arbiter is configured to receive a bid level corresponding to the number of units generated for each of the requests;

wherein the traffic control subsystem is a set of traffic lights at an intersection, the computer processor further configured to:

appeal, via a portion of the requests from a first set of vehicles facing a first direction at the intersection, to change a traffic light in the set of traffic lights from the first state to the second state; and appeal, via another portion of the requests from a second set of vehicles facing a second direction at the intersection, to maintain in the first state a traffic light in the set of traffic lights.

8. The system of claim 7, wherein the traffic control subsystem includes:

an electronic speed sign, the requests specify an appeal to increase the speed limit, and the pre-defined condition is met when a volume of vehicles in a defined area associated with the electronic speed sign meets a threshold level, wherein a current speed limit is the first state and an increased speed limit is the second state; and an electronic commuter lane sign, the requests specify an appeal to open a commuter lane to all traffic, and the pre-defined condition is met when a volume of vehicles in a defined area associated with the electronic commuter lane sign meets a threshold level, wherein a restriction on a use of commuter lane is the first state and a removal of the restriction on the use of the commuter lane is the second state.

9. The system of claim 7, wherein the pre-defined condition includes:

maintaining the first state if an overall monetary value of the bids from the second set of vehicles meets or exceeds an overall monetary value of the bids from the first set of vehicles; and changing the first state to the second state if an overall monetary value of the bids from the second set of vehicles is less than an overall monetary value of the bids from the first set of vehicles.

10. The system of claim 7, wherein the pre-defined condition includes:

maintaining the first state if a total number of units from the bids received from the second set of vehicles meets or exceeds a total number of units from the bids received from the first set of vehicles; and changing the first state to the second state if a total number of units from the bids from the second set of vehicles is less than the total number of units from the bids received from the first set of vehicles.

11. The system of claim 7, wherein the computer processor is further configured to:

apply a constraint to the requests, the constraint comprising one of:

a minimum time period in at least one of the first state and the second state;

a maximum time period in at least one of the first state and the second state;

identification of an emergency vehicle in proximity of the traffic control subsystem;

weather conditions detected in proximity of the traffic control subsystem; and road conditions detected in proximity of the traffic control subsystem; and implement the traffic flow control activity responsive to application of the pre-defined condition and the constraint.

12. The system of claim 7, wherein the computer processor is further configured to:

receive, at the arbiter of the traffic control subsystem, a request from a second arbiter of another traffic control subsystem, the arbiter of the traffic control subsystem and the second arbiter of the other traffic control subsystem forming part of a traffic control system, the traffic control system collectively rendering a decision for a traffic flow control activity based on requests received at multiple traffic control subsystems, and implement, by each of the multiple traffic control subsystems including the traffic control subsystem and the other traffic control subsystem, the traffic flow control activity associated with the decision.

13. A computer program product for providing traffic flow control services, the computer program product comprising a tangible storage medium embodied with instructions, which when executed by a computer cause the computer to:

receive requests, at an arbiter of a traffic control subsystem, the traffic control subsystem is in a first state, the requests received from vehicle transmitters of vehicles that are commuting in proximity of the traffic control subsystem;

apply a pre-defined condition to the requests; and implement a traffic flow control activity responsive to application of the pre-defined condition, the traffic flow control activity including one of: maintaining the first state, and changing the first state of the traffic control subsystem to a second state;

wherein each of the requests is implemented as a bid representing a number of units, each of the units associated with a monetary value, and the arbiter is configured to receive a bid level corresponding to the number of units generated for each of the requests;

wherein the traffic control subsystem is a set of traffic lights at an intersection, the instructions further causing the computer to:

appeal, via a portion of the requests from a first set of vehicles facing a first direction at the intersection, to change a traffic light in the set of traffic lights from the first state to the second state; and appeal, via another portion of the requests from a second set of vehicles facing a second direction at the intersection, to maintain in the first state a traffic light in the set of traffic lights.

14. The computer program product of claim 13, wherein the traffic control subsystem includes:

an electronic speed sign, the requests specify an appeal to increase the speed limit, and the pre-defined condition is met when a volume of vehicles in a defined area associated with the electronic speed sign meets a threshold level, wherein a current speed limit is the first state and an increased speed limit is the second state; and an electronic commuter lane sign, the requests specify an appeal to open a commuter lane to all traffic, and the pre-defined condition is met when a volume of vehicles in a defined area associated with the electronic commuter lane sign meets a threshold level, wherein a restriction on a use of commuter lane is the first state and a removal of the restriction on the use of the commuter lane is the second state.

15. The computer program product of claim 13, wherein the instructions further cause the computer to:

receive, at the arbiter of the traffic control subsystem, a request from a second arbiter of another traffic control subsystem, the arbiter of the traffic control subsystem and the second arbiter of the other traffic control subsystem forming part of a traffic control system, the traffic control system collectively rendering a decision for a traffic flow control activity based on requests received at multiple traffic control subsystems, and implement, by each of the multiple traffic control subsystems including the traffic control subsystem and the other traffic control subsystem, the traffic flow control activity associated with the decision.

* * * * *